United States Patent [19]
Suzuki et al.

[11] Patent Number: 5,912,757
[45] Date of Patent: Jun. 15, 1999

[54] IMAGE-WISE EXPOSURE APPARATUS

[75] Inventors: Kenji Suzuki; Hiroshi Sunagawa, both of Kanagawa-ken; Takashi Suzuki, Saitama-ken, all of Japan

[73] Assignee: Fuji Photo Film Co., Ltd., Kanagawa-ken, Japan

[21] Appl. No.: 08/865,865

[22] Filed: May 30, 1997

[30] Foreign Application Priority Data

May 30, 1996 [JP] Japan ................. 8-136949

[51] Int. Cl.$^6$ ................................................. G02B 26/00
[52] U.S. Cl. ......................... 359/223; 359/850; 355/67
[58] Field of Search ............... 355/67, 71; 359/850–851, 359/223–224, 290, 291, 295, 846, 849, 855

[56] References Cited

U.S. PATENT DOCUMENTS

| | | | |
|---|---|---|---|
| 5,471,584 | 11/1995 | Blaxtan et al. | 359/850 |
| 5,633,755 | 5/1997 | Manabe et al. | 355/67 |
| 5,828,485 | 10/1998 | Hewlett | 359/291 |

OTHER PUBLICATIONS

"O plus E", Oct. 1994; pp. 90–94.

*Primary Examiner*—Safet Metjahic
*Assistant Examiner*—Michael Dalakis

*Attorney, Agent, or Firm*—Sughrue, Mion, Zinn, Macpeak & Seas, PLLC

[57] ABSTRACT

An image-wise exposure apparatus includes a light source for emitting recording light to which a photosensitive material is exposed and a mirror array device. The mirror array device includes a plurality of small mirrors which are two-dimensionally arrayed on a substrate surface and are movable between ON-positions where each of the small mirrors reflects the recording light to impinge upon the photosensitive material and OFF-positions where each of the small mirrors reflects the recording light not to impinge upon the photosensitive material and a drive mechanism which sets the respective small mirrors selectively in the ON-positions or in the OFF positions independently of each other. A control circuit controls the drive mechanism according to an image signal, and an image forming lens causes light reflected from the mirror array device to form an image on the photosensitive material. Each of the small mirrors is inclined by an angle θ with respect to the substrate surface in the ON-position and by an angle −θ with respect to the substrate surface in the OFF-position. The image forming lens forms a shifted optical system in which the optical axis of the image forming lens is off a line which is perpendicular to the substrate surface and passes through the center of the mirror array device.

1 Claim, 5 Drawing Sheets

PRIOR ART

IMAGE-WISE EXPOSURE APPARATUS

BACKGROUND OF THE INVENTION

1. Field of the Invention

This invention relates to an image-wise exposure apparatus, wherein a photosensitive material is exposed image-wise by use of a mirror array device.

2. Description of the Related Art

As described, for instance, in "O plus E" magazine, the October number, 1994, pp. 90–94, there has been known a mirror array device comprising a plurality of small mirrors which are arranged in the form of a two-dimensional array, and a drive means for changing the orientations of the respective small mirrors independently from each other so that light impinging upon each of the small mirrors is reflected selectively toward one of two directions.

With such a mirror array device, an image can be projected onto a predetermined projection surface via the mirror array device while modulating the light impinging upon the projection surface for each of the small mirrors by controlling the drive means according to an image signal. When a photosensitive material is located on the projection surface, the photosensitive material can be exposed image-wise. (An example of such an image-wise exposure apparatus is disclosed in this applicant's Japanese Patent Application No. 8(1996)-39489)

Further the amount of light impinging upon the photosensitive material can be controlled for each of the small mirrors by, for instance, pulse width modulation of the on time of each small mirror (i.e., the time each smaller mirror is set in the orientation in which the light is caused to impinge upon the photosensitive material) within a frame time, whereby a gradation image can be formed on the photosensitive material.

Generally such a mirror array device is monolithically formed on a substrate (typically of silicone) and each small mirror is arranged to selectively take a position where it is inclined by an angle θ with respect to the substrate surface and a position where it is inclined by an angle −θ with respect to the substrate surface. When the mirror is in one of the two positions, the recording light impinging upon the mirror is caused to impinge upon the photosensitive material and when the mirror is in the other position, the recording light impinging upon the mirror cannot impinge upon the photosensitive material.

In an image-wise exposure apparatus using such a mirror array device, an image forming lens which causes light from the mirror array device to form an image on the photosensitive material is provided. Conventionally the image forming lens is positioned so that its optical axis is in alignment with the line which is perpendicular to the substrate surface and passes through the center of the mirror array device.

However the conventional image-wise recording apparatus where the image forming lens is positioned in the manner described above is disadvantageous in that the conjugate distance of the optical system becomes too long and the overall size of the apparatus is greatly enlarged in order to prevent interference of the recording light impinging upon the mirror array device and the reflected light from the mirror array device with each other.

SUMMARY OF THE INVENTION

In view of the foregoing observations and description, the primary object of the present invention is to provide an image-wise exposure apparatus using a mirror array device in which the conjugate distance of the optical system of the mirror array device can be shortened so that the image-wise exposure apparatus can be small in size.

In accordance with the present invention, there is provided an image-wise exposure apparatus comprising a light source for emitting recording light to which a photosensitive material is exposed, a mirror array device comprising a plurality of small mirrors which are two-dimensionally arrayed on a substrate surface and are movable between ON-positions where each of the small mirrors reflects light impinging thereon in a first direction in which the reflected light impinges upon the photosensitive material and OFF-positions where each of the small mirrors reflects light impinging thereon in a second direction in which the reflected light does not impinge upon the photosensitive material and a drive mechanism which sets the respective small mirrors selectively in said ON-positions or in said OFF positions independently of each other, a control circuit which controls the drive mechanism according to an image signal, and an image forming lens which causes light reflected from the mirror array device in said first directions to form an image on the photosensitive material wherein the improvement comprises that each of the small mirrors is inclined by an angle θ with respect to the substrate surface in the ON-position and by an angle −θ with respect to the substrate surface in the OFF-position, and said image forming lens forms a shifted optical system in which the optical axis of the image forming lens is off a line which is perpendicular to the substrate surface and passes through the center of the mirror array device.

DESCRIPTION OF THE PREFERRED EMBODIMENT

Figure 1:
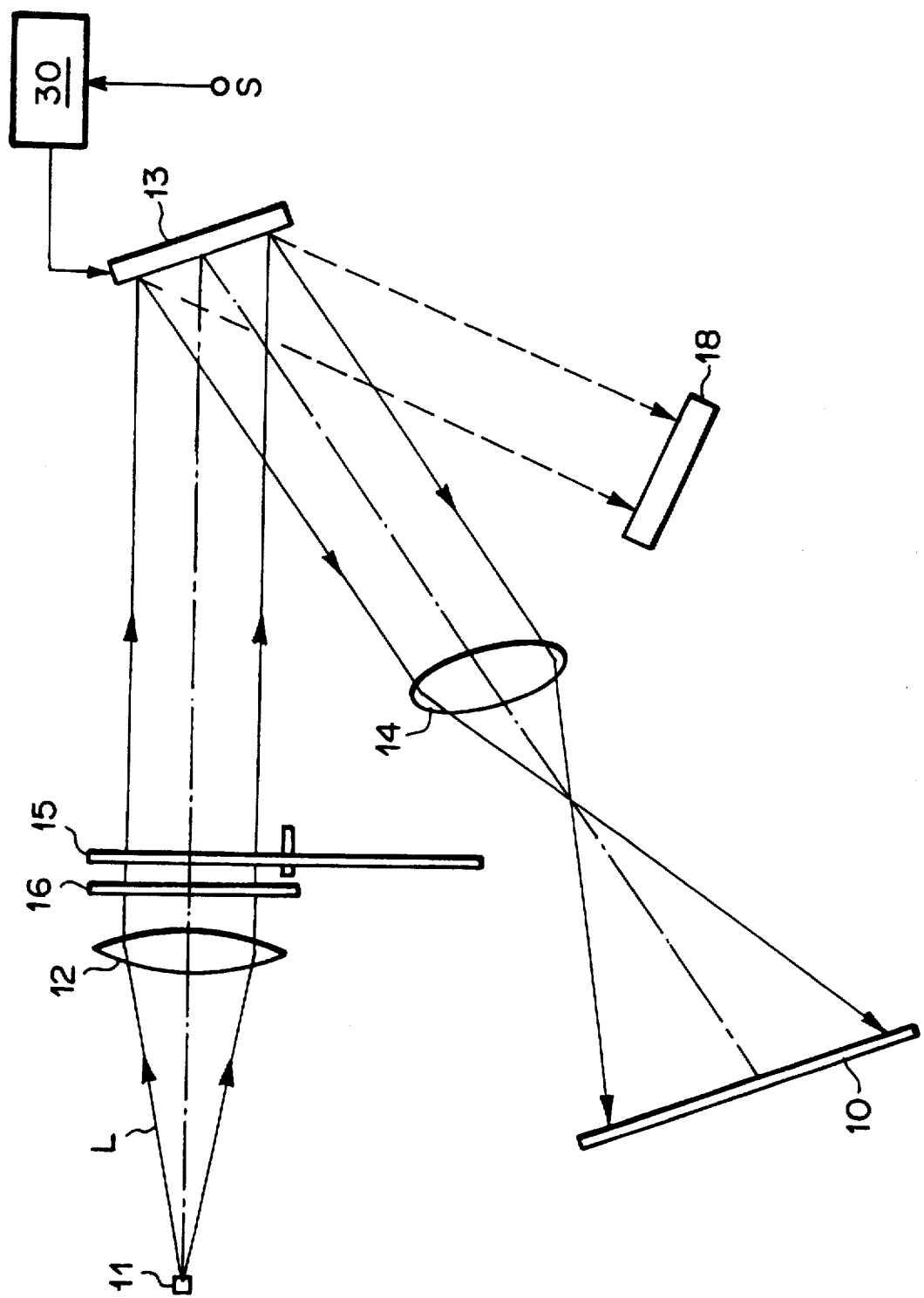
FIG. 1 is a plan view showing an image-wise exposure apparatus in accordance with an embodiment of the present invention.

In FIG. 1, an image-wise exposure apparatus in accordance with a first embodiment of the present invention comprises a light source 11 such as a halogen lamp which emits white recording light L to which a color photosensitive material 10 is to be exposed and a converging lens 12 which is located so that the light source 10 is in the vicinity of the focal point of the converging lens 12. The converging lens 12 collimates the recording light L from the light source 10. The image-wise exposure apparatus further comprises a mirror array device 13 positioned so that the collimated recording light L impinges upon the mirror array device 13, an image forming lens 14 positioned so that the recording light L reflected from small mirrors 20 (FIG. 2) of the mirror array device 13 in the ON-positions (to be described later) enters the image forming lens 14 and a color filter 15 and a black shutter 16 which are inserted into the optical path of the recording light L upstream of the mirror array device 13. A light absorbing member 18 is disposed to absorb light reflected from the small mirrors 20 in the OFF-positions (to be described later).

Figure 2:
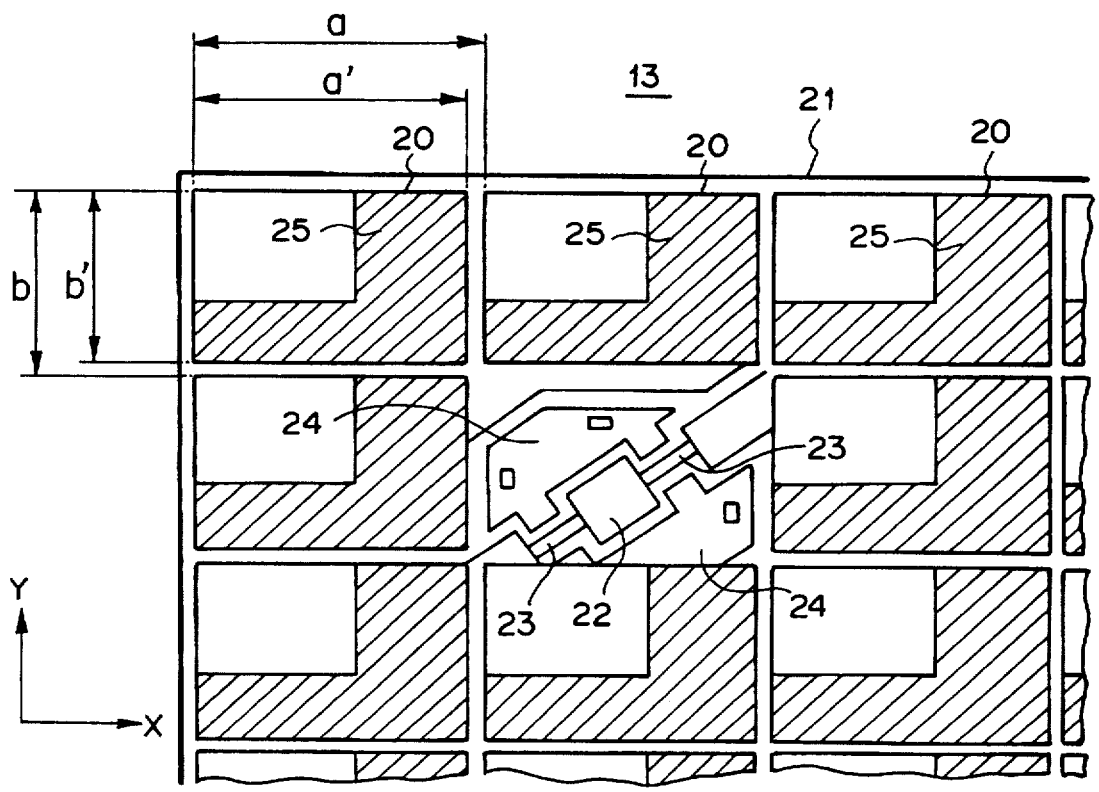
FIG. 2 is a front view partly cutaway of a mirror array device employed in the image-wise exposure apparatus.

As shown in FIG. 2, the mirror array device 13 comprises a plurality of small mirrors 20 two-dimensionally arranged (in X- and Y-directions normal to each other) on a silicone substrate 21. Each small mirror 20 is of aluminum alloy or the like and rectangular in shape. The small mirrors 20 are arranged at pitches a, e.g., 17 μm, in X-direction and at pitches b, e.g., 17 μm, in Y-direction. The size a' of each of the small mirrors 20 as measured in X-direction and the size b' of each of the small mirrors 20 as measured in Y-direction are sufficiently close respectively to the mirror pitches a and b in X- and Y-directions.

In FIG. 2, a small mirror 20 at the center is removed to show a drive mechanism for the small mirror 20. Each of the small mirrors 20 in the mirror array device 13 is provided with such a drive mechanism. As shown in FIG. 2, the drive mechanism comprises a yoke 22 which supports the small mirror 20 by way of a support pin (not shown), a pair of torsion hinges 23 which support the yoke 22, a pair of address electrodes 24 and a bias bus (not shown) disposed below these elements. The orientation of the torsion hinges 23 is changed by electrostatic force produced by an electric voltage applied to the address electrodes 24. Each of the small mirrors 20 is provided with an antireflective mask 25 for limiting the effective aperture of the small mirror 20.

Voltage application to the address electrodes 24 for each small mirror 20 is controlled by a control circuit 30 (FIG. 1) which receives an image signal S representing a gradation image. That is, when no voltage is applied to the electrodes 24, the hinges 23 (accordingly the small mirror 20) is held in parallel to the substrate 21. When an electric voltage of a predetermined polarity is applied to one of the electrodes 24 and a complimentary voltage of the reverse polarity is applied to the other electrode 24, the small mirror 20 is inclined by angle −θ relative to the substrate surface as shown in FIG. 3, and when the reverse voltages are applied to the electrodes 24, the small mirror 20 is inclined by angle θ relative to the substrate surface as shown in FIG. 4.

Figure 3:
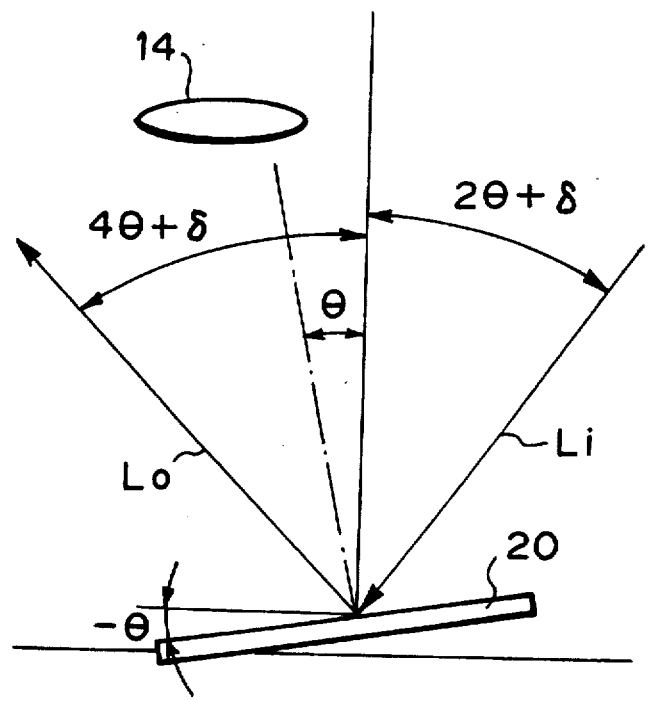
FIG. 3 is a side view showing a state of a small mirror in the mirror array device with respect to the image forming lens in the image-wise exposure apparatus shown in FIG. 1.
Figure 4:
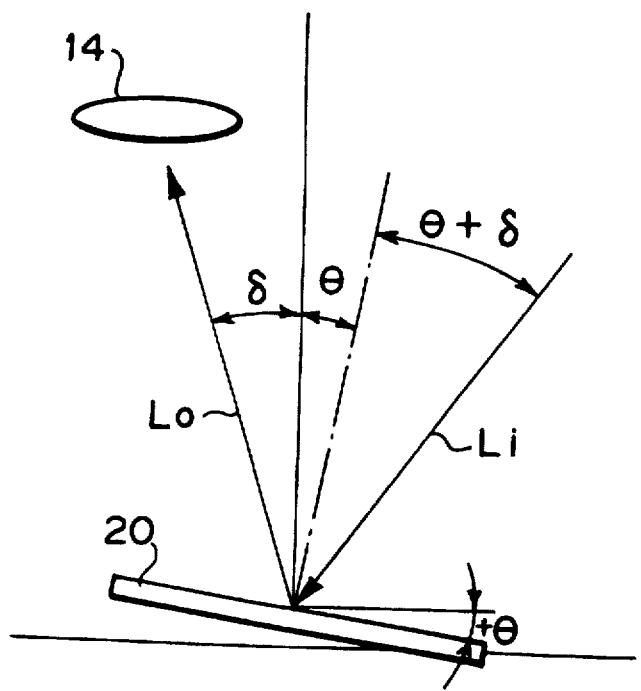
FIG. 4 is a side view showing another state of a small mirror in the mirror array device with respect to the image forming lens in the image-wise exposure apparatus shown in FIG. 1.

When the small mirror 20 is in the position shown in FIG. 3, the recording light L reflected by the small mirror 20 cannot enter the image forming lens 14 and when the small mirror 20 is in the position shown in FIG. 4, the recording light L reflected by the small mirror 20 enters the image forming lens 14 and impinges upon the photosensitive material 10. Thus whether the recording light L impinges upon the photosensitive material 10 can be controlled small mirror by small mirror. The position of the small mirror 20 shown in FIG. 3 will be referred to as "OFF-position" and that shown in FIG. 4 will be referred to as "ON-position", hereinbelow. By controlling the ON time of each small mirror 20 (the time for which the small mirror 20 is in the ON-position) according to an image signal S, for instance, by pulse width modulation, the amount of the recording light L impinging upon the photosensitive material 10 is controlled for each small mirror 20, whereby a gradation image is formed on the photosensitive material 10.

In FIGS. 3 and 4, the image forming lens 14 is shown only for the purpose of showing the angular aperture of the image forming lens 14 and the size and position of the image forming lens 14 are different from the actual size and position. (the same in FIGS. 6 and 7 to be described later)

The color filter 15 comprises red, green and blue filters. The red, green and blue filters are inserted into the optical path of the recording light L in sequence. While one of the filters is in the optical path of the recording light L, the mirror array device 13 is driven according to the color image signal corresponding to the color of the inserted filter. While the filter is switched, all the small mirrors 20 are kept in the OFF-position. Thus the color photosensitive material 10 is sequentially exposed to the modulated red, green and blue lights, whereby a color latent image is recorded on the color photosensitive material 10. The recording light L reflected by the small mirrors 20 in the OFF-position is absorbed by the light absorbing member 18. Thereafter the color photosensitive material 10 is subjected to an ordinary developing process and the latent image on the photosensitive material 10 is developed into a visible image.

As shown in FIGS. 3 and 4, the image forming lens 14 forms a shifted optical system in which the optical axis of the image forming lens 14 is off a line which is perpendicular to the substrate surface and passes through the center of the mirror array device 13. This arrangement makes it feasible to shorten the conjugate distance of the optical system, whereby the image-wise exposure apparatus can be small in size as will be described in detail, hereinbelow.

Figure 5:
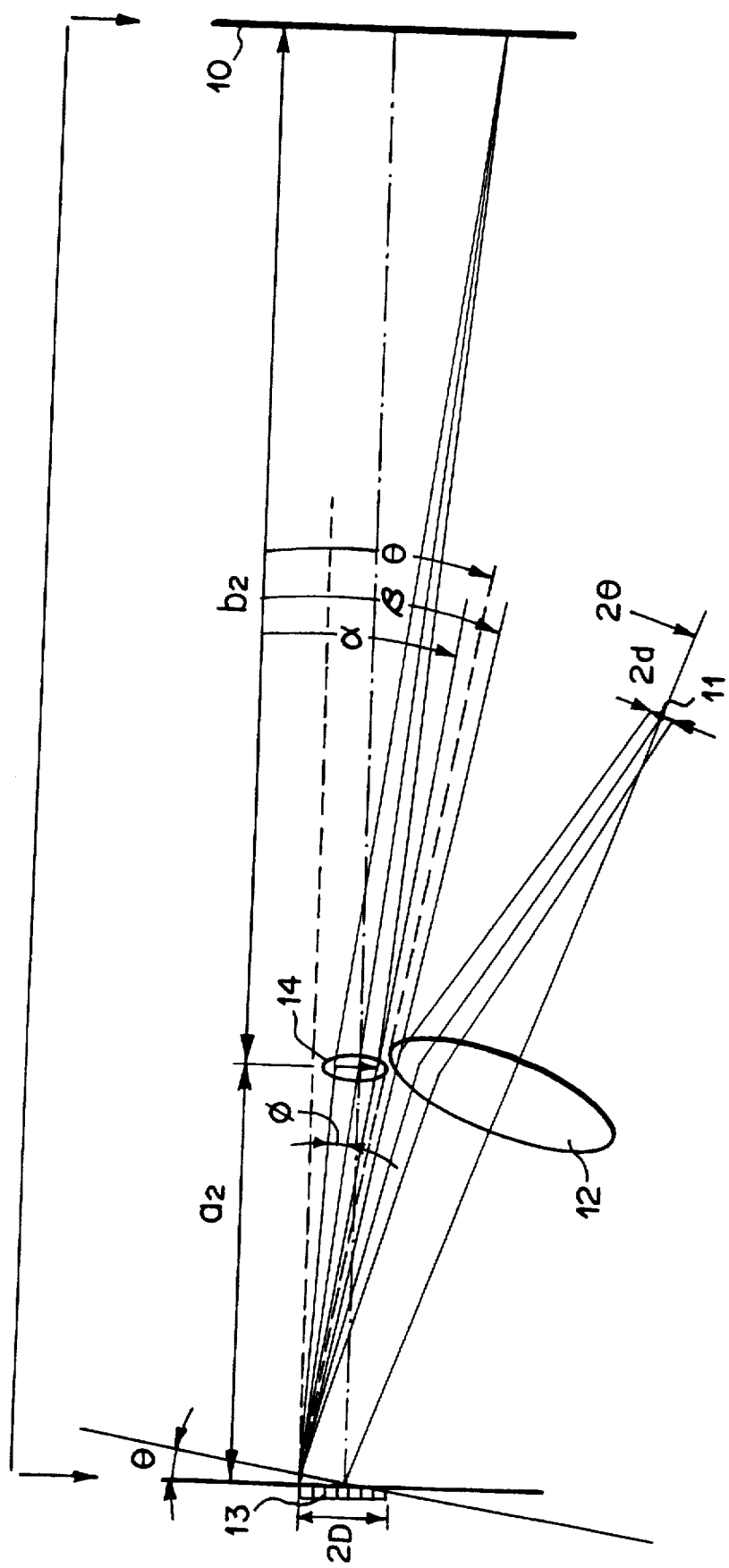
FIG. 5 is a view for illustrating the effect of the present invention.

The condition for preventing interference of the recording light impinging upon the mirror array device and the reflected light from the mirror array device with each other in the conventional image-wise exposure apparatus will be discussed first with reference to FIG. 5. In FIG. 5, reference numerals 10 to 14 respectively denote a photosensitive material, a light source, a condenser lens, a mirror array device and an image forming lens. It is assumed that the size of the light source 11 (the size of the filament of the light source 11) is 2d and an image of the light source 11 is formed on the pupil of the image forming lens 14 by the condenser lens 12.

Figure 6:
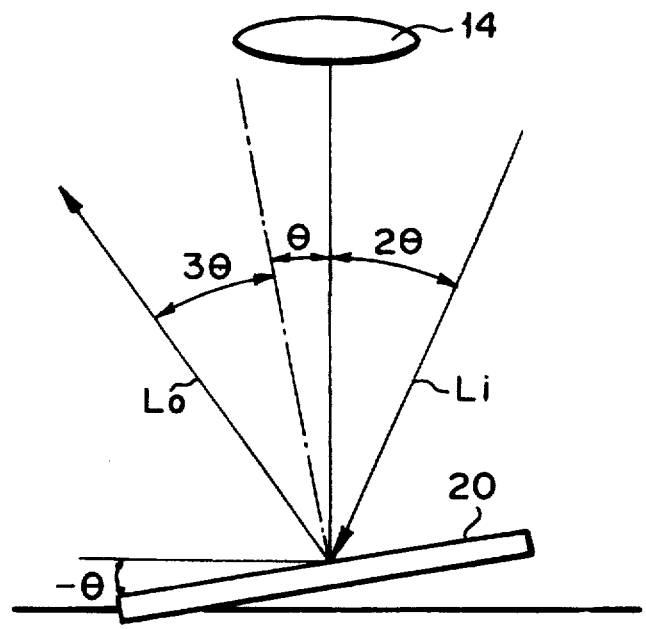
FIG. 6 is a side view showing a state of a small mirror in the mirror array device with respect to the image forming lens in a conventional image-wise exposure apparatus.
Figure 7:
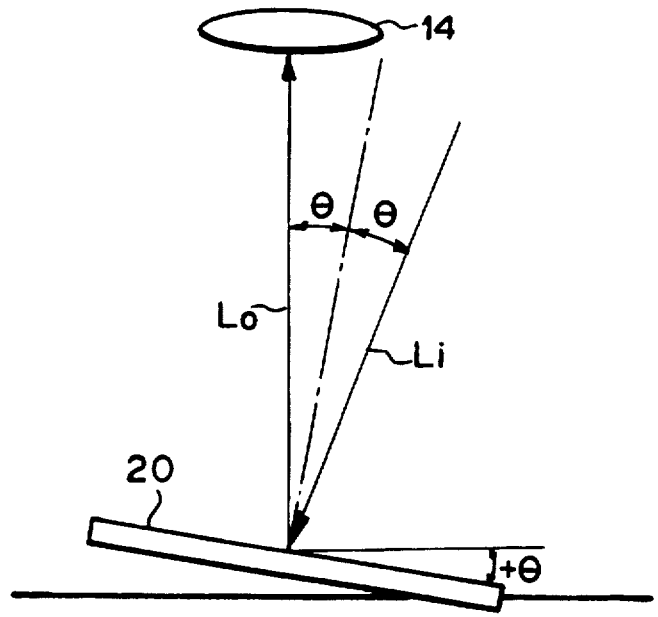
FIG. 7 is a side view showing another state of a small mirror in the mirror array device with respect to the image forming lens in the conventional image-wise exposure apparatus.

Further as shown in FIGS. 6 and 7, each of the small mirrors 20 is inclined by an angle θ with respect to the substrate surface of the mirror array device 13 in the ON-position and by an angle −θ with respect to the substrate surface in the OFF-position. In the conventional image-wise exposure apparatus, the image forming lens 14 is positioned so that its optical axis is in alignment with a line which is perpendicular to the substrate surface and passes through the center of the mirror array device 13.

As shown in FIGS. 6 and 7, the incident light (recording light) Li impinges upon the small mirror 20 in a direction which is at angle 2θ to a perpendicular to the substrate surface of the mirror array device 13, and when the small mirror 20 is in the ON-position where the small mirror 20 is inclined by angle θ with respect to the substrate surface as shown in FIG. 7, the reflected light Lo travels along the perpendicular and enters the image forming lens 14. On the other hand, when the small mirror 20 is in the OFF-position where the small mirror 20 is inclined by angle −θ with respect to the substrate surface as shown in FIG. 6, the reflected light Lo travels in a direction which is at angle $4\theta$ to the perpendicular and does not enter the image forming lens 14.

The condition for preventing interference of the reflected light at angle $\alpha$ to the perpendicular and the incident light at angle $\beta$ to the perpendicular which are closest to each other in FIG. 5 is obtained. When the length of the mirror array device 13 is represented by 2D and the angle of divergence of the light bundle is represented by $\Phi$, $\alpha = (D/a2)+\Phi$ and $\beta = 2\theta - (D/a2) - \Phi$.

When $\beta > \alpha$, the reflected light at angle $\alpha$ and the incident light at angle $\beta$ do not interfere with each other. That is, $2\theta - (D/a2) - \Phi > (D/a2) + \Phi$. Accordingly, $$a2 > D/(\theta - \Phi) \quad (1)$$

Accordingly, as the angle $\theta$ by which the small mirror 20 is inclined with respect to the substrate surface in the ON-position reduces, a2 must be larger and when the angle of divergence $\Phi$ of the light bundle from the mirror array device 13 is made substantially equal to the angle of inclination $\theta$ of the small mirrors 10 in order to improve MTF, a2 must be further larger.

When the length of the short side of exposure on the photosensitive material 10 is represented by 2W, the magnification m is equal to W/D. Accordingly the conjugate distance L (the distance between the mirror array device 13 and the photosensitive material 10) is represented as follows.

$$L = a2 + b2 \quad (2)$$
$$= (1 + m)a2$$
$$= (1 + W/D)a2$$

On the basis of formulae (1) and (2), the condition for preventing interference of the reflected light at angle $\alpha$ and the incident light at angle $\beta$ is as follows.

$$L > (D+W)/(\theta - \Phi) \quad (3)$$

Specifically, when the length 2D of the mirror array device 13 is 19.6 mm (the short side of the array of 2048×1152 small mirrors), the length 2W of the short side of exposure on the photosensitive material 10 is 210 mm (the short side of an A4 sheet), the magnification m is 10.7, the angle of inclination $\theta$ of the small mirrors 20 is 10 deg. (=0.175 rad.) and the angle of divergence $2\Phi$ of the light bundle from the mirror array device 13 is 8 deg. (=0.140 rad.), the optical system should not be shorter than 1 meter according to formula (3).

To the contrast, in the case of the embodiment of the present invention, the image forming lens 14 forms a shifted optical system in which the optical axis of the image forming lens 14 is off the line which is perpendicular to the substrate surface and passes through the center of the mirror array device 13 as described above.

When the angle of shift is represented by $\delta$, in the embodiment described above, the incident light (recording light) Li impinges upon the small mirror 20 in a direction which is at angle $2\theta + \delta$ to a perpendicular to the substrate surface of the mirror array device 13, and when the small mirror 20 is in the ON-position where the small mirror 20 is inclined by angle $\theta$ with respect to the substrate surface as shown in FIG. 4, the reflected light Lo travels in a direction at angle $\delta$ to the perpendicular and enters the image forming lens 14. On the other hand, when the small mirror 20 is in the OFF-position where the small mirror 20 is inclined by angle $-\theta$ with respect to the substrate surface as shown in FIG. 3, the reflected light Lo travels in a direction which is at angle $4\theta + \delta$ to the perpendicular and does not enter the image forming lens 14.

The condition for preventing interference of the recording light impinging upon the mirror array device and the reflected light from the mirror array device with each other in the image-wise exposure apparatus will be now discussed with reference to FIG. 5.

In this case, $\alpha = (D/a2) + \Phi - \delta$ and $\beta = (2\theta + \delta) - (D/a2) - \Phi$.

When $\beta > \alpha$, the reflected light at angle $\alpha$ and the incident light at angle $\beta$ do not interfere with each other. That is, $(2\theta + \delta) - (D/a2) - \Phi > (D/a2) + \Phi - \delta$. Accordingly, $$a2 > D/(\theta + \delta - \Phi) \quad (4)$$

On the basis of formulae (4) and (2), the condition for preventing interference of the reflected light at angle $\alpha$ and the incident light at angle $\beta$ is as follows in this embodiment.

$$L > (D+W)/(\delta + \theta - \Phi) \quad (5)$$

As can be understood from the comparison of the formulae (3) and (5), the conjugate distance L may be smaller in the image-wise exposure apparatus of the embodiment described than in the conventional image-wise exposure apparatus.

Specifically, in the case of the image-wise exposure apparatus of this embodiment, when the length 2D of the mirror array device 13 is 19.6 mm, the length 2W of the short side of exposure on the photosensitive material 10 is 210 mm, the magnification m is 10.7, the angle of inclination $\theta$ of the small mirrors 20 is 10 deg. (=0.175 rad.) and the angle of divergence $2\Phi$ of the light bundle from the mirror array device 13 is 8 deg. (=0.140 rad.) as in the specific example for the conventional image-wise exposure apparatus given above with the angle of shift $\delta$ of 8 deg. (=0.140 rad.), the conjugate distance L has only to be not smaller 468 mm according to formula (5), which is much shorter than that for the conventional image-wise exposure apparatus given above.

Thus the image-wise exposure apparatus in accordance with the present invention can be sufficiently small in size and can be installed in a narrow space.

Further in the image-wise exposure apparatus in accordance with the present invention, the angle of inclination $\theta$ of the small mirrors for a given conjugate distance L may be larger and accordingly the F number of the optical system may be larger, whereby a clearer optical system can be obtained and deterioration in MTF due to diffraction of light can be prevented.

Further in accordance with the present invention, the angle of inclination $\theta$ of the small mirrors of the mirror array device may be reduced for a given conjugate distance L without involving interference of the incident light and the reflected light.

What is claimed is:

1. An image-wise exposure apparatus comprising
   a light source for emitting recording light to which a photosensitive material is exposed,
   a mirror array device comprising a plurality of small mirrors which are two-dimensionally arrayed on a substrate surface and are movable between ON-positions where each of the small mirrors reflects light impinging thereon in a first direction in which the reflected light impinges upon the photosensitive material and OFF-positions where each of the small mirrors reflects light impinging thereon in a second direction in which the reflected light does not impinge upon the photosensitive material and a drive mechanism which sets the respective small mirrors selectively in said ON-positions or in said OFF positions independently of each other, a control circuit which controls the drive mechanism according to an image signal, and an image forming lens which causes light reflected from the mirror array device in said first directions to form an image on the photosensitive material wherein the improvement comprises that each of the small mirrors is inclined by an angle $\theta$ with respect to the substrate surface in the ON-position and by an angle $-\theta$ with respect to the substrate surface in the OFF-position, and said image forming lens forms a shifted optical system in which the optical axis of the image forming lens is off a line which is perpendicular to the substrate surface and wherein said line passes through the center of the mirror array device.

* * * * *